United States Patent
Roberts

[15] 3,670,140
[45] June 13, 1972

[54] JOINING OF TUBES TO TUBE PLATES

[72] Inventor: Daniel Frank Thomas Roberts, Kent, England

[73] Assignee: Foster Wheeler John Brown Boilers Limited, London, England

[22] Filed: Feb. 24, 1970

[21] Appl. No.: 13,460

[30] Foreign Application Priority Data

Feb. 27, 1969 Great Britain......................10,519/69

[52] U.S. Cl..............................219/137, 29/157.4, 29/472.1
[51] Int. Cl........................................................B23k 9/10
[58] Field of Search ..................29/157.4, 472.1, 471.1, 426; 122/365; 165/178; 219/137, 125

[56] References Cited

UNITED STATES PATENTS

| | | |
|---|---|---|
| 2,996,600 | 8/1961 | Gardner et al..........................219/137 |
| 3,496,629 | 2/1970 | Martucci et al.................29/157.4 UX |
| 2,986,454 | 5/1961 | Jewett....................................165/158 |
| 3,205,340 | 9/1965 | Gotch..............................29/157.4 X |

FOREIGN PATENTS OR APPLICATIONS 1,420,678 11/1965 France...................................219/137

Primary Examiner—Carroll B. Dority, Jr.
Attorney—Dowell & Dowell

[57] ABSTRACT

This invention relates to the joining of tubes to tube sheets in alignment with bores through the latter. These bores are slightly larger in diameter than the outside diameters of the tubes. An annular filler insert is positioned adjacent the end of the bore in engagement with the end of the tube. When a non-consumable electrode arc weld is made, the insert melts and becomes united with the end of the tube and the tube sheet, the shape and size of the insert being such that the resulting join has a smooth crevice-free contour, between the tube and the tube sheet.

3 Claims, 2 Drawing Figures

JOINING OF TUBES TO TUBE PLATES

This invention relates to the joining of tubes to tube plates or headers by welding, and for the sake of convenience reference made hereinafter to tube plates includes reference to headers unless the context specifically requires otherwise.

BACKGROUND OF THE INVENTION

There are many ways in which tubes can be welded to tube plates. However, to obtain a really satisfactory join it is essential to ensure that there are no crevices in the faces of the join. Only in this way can one ensure that crevice corrosion does not occur.

The internal bore welding torch described in our United Kingdom Pat. No. 934,485 can be used to give crevice-free joins between the ends of tubes and short stub tubes formed on or welded to a tube plate. It is very difficult, however, to obtain a crevice-free join between the end of a tube and the relatively massive tube plate itself because it is very difficult to obtain even fusion right the way round the weld unless the welding apparatus and the parts to be welded are of the very highest accuracy, the latter being something which commercially available tubes simply do not possess.

It is, therefore, an object of this invention to provide a crevice-free join between a tube and a tube plate which is relatively simple to make and which does not require anything like the same stringent requirements of accuracy to achieve a really satisfactory weld.

THE INVENTION

According to the invention there is provided a method of making a welded join between a tube and a tube plate in alignment with a bore through the latter, the bore having a diameter slightly larger than the outside diameter of the tube, in which an annular filler insert is positioned in or near the end of the bore in engagement with the end of the tube and a weld is made with a non-consumable electrode, the insert having a cross-section such that it fuses during welding and becomes united with the end of the tube and with the tube plate to give a smooth crevice-free weld contour between the tube and tube plate.

The invention also extends to the joint made by this method.

By correctly choosing the size and/or the shape of the annular filler insert one can ensure that there is a sufficient reserve of material so that during welding a smooth uniform weld contour is given.

The join according to the invention is quite simple and easy to make and no difficult preparation of the end of the tube or of the tube place is required. The tube plate need require no preparation other than drilling the bore, while, if desired, the end of the tube can be slightly chamfered.

Because the insert is small relatively to the tube and tube plate it will quickly become completely fused and ensure that no crevices are left between it and the other parts, even though the dimensions of the parts are not highly accurate in size or accurately aligned. If the filler insert has an overall outside diameter larger than the diameter of the bore in the tube plate, the insert can be made in a number of annular segments so that these can be inserted through the bore in the tube plate. When the annular segments are reassembled, however, there must be no gaps between them which are larger than three thirty-seconds inch.

The composition of the filler insert can be chosen so as to reduce and virtually eliminate hot cracking of the join during welding or embrittlement due to other causes.

The join so prepared according to the invention has the additional and highly important advantage that the join can be severed and the tube removed, replaced and the new tube joined to the plate or header by the method of the invention. This is of course particularly important in heat exchangers when the tube forms part of a tube bank extending between two tube plates and is not removable except through the bore in the tube plate. The tube can of course be readily severed from the plate by drilling or other machining method, and a new tube can be joined to the plates by an internal bore welding technique using a torch such as the one described in our United Kingdom Pat. No. 934,485. When welding a new tube in place care must be taken, when necessary, to prevent contamination. This can be achieved by providing a controlled atmosphere on the reverse side of the weld to prevent oxidation or contamination by exclusion of the air with an inert shielding gas, a powdered flux or non-fusable backing rings such as suitably shaped non-recoverable ceramic half rings or recoverable copper-tungsten half rings. These backing rings can if desired, be suitably shaped so as to impart a desired profile to the weld surface. In certain cases such as mild and low alloy steels the insert may have a composition which reduces atmospheric contamination to an acceptable level without requiring inert gas shielding or the use of backing rings.

The join of the invention is made by an internal bore welding technique or by an external welding technique.

DESCRIPTION OF THE DRAWINGS

An embodiment of the invention will now be illustrated, by way of example, with reference to the accompanying diagrammatic drawings, in which.

DESCRIPTION OF THE PREFERRED EMBODIMENT

Figure 1:
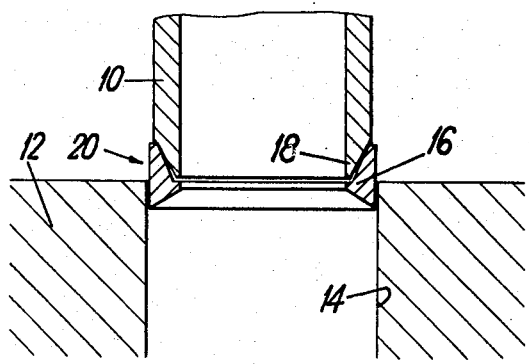
FIG. 1 is an axial section through a tube and tube plate before making a weld according to the invention.

FIG. 1 shows in section a tube 10 to be joined to a tube plate 12. Through the latter is a bore 14 of slightly larger diameter than the outside diameter of the tube 10.

Fitted in the end of the bore 14 is an annular filler insert 16. This may be of circular cross-sectional shape or another shape which provides adequate pre-shaping of the material of the insert towards the final desired smooth weld contour. Preferably, however, it has the cross-sectional shape shown in FIG. 1.

As can be seen the insert 16 fits closely within the bore and also the end 18 of the tube has to be chamfered so as to fit closely with the insert. The accuracy of fitting does not have to be particularly high, however, since the insert 16 has a cross-sectional area sufficiently large to provide a reserve of material which, when melted by the arc, will flow to accommodate small irregularities or misalignments of the axes of the tube, bore and insert, and to allow for the tolerance in the diameter of the tube.

The insert may, for instance, be formed in a number of parts and these parts inserted or assembled against the inner face of the tube plate, for example, during assembly of the tubes to the tube plate.

Figure 2:
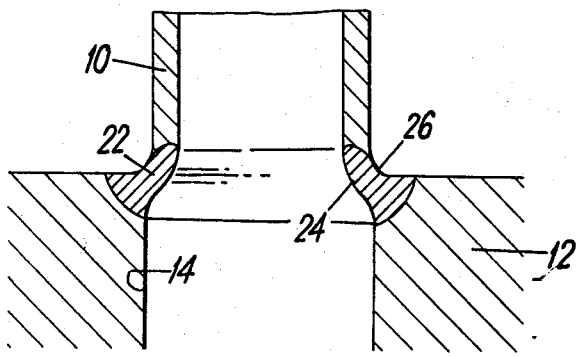
FIG. 2 is an axial section through the completed weld.

Once the various parts have been assembled as shown in FIG. 1 a weld is made, for example, with an inert gas shielded internal bore welding torch as shown in our United Kingdom Pat. No. 934,485, the reverse side 20 of the weld region being covered, for example, with a flux. During the welding the insert 16 becomes completely fused because it is of much smaller mass than either the tube 10 or tube plate 12. The insert 16 becomes united both to the end of the tube 10 and to the tube plate 12, giving a welded join 22 as shown in FIG. 2.

The resulting join 22 has a smooth contour joining the tube to the plate both on the internal surface 24 and external surface 26 of the weld. The join is also crevice-free.

The way in which the join 22 is made is quick and simple and the join is excellent even though there may have been some slight misalignment or inaccuracies in the various parts.

The making of the join is a simple welding operation and in addition, the tube plate has required no special preparation or machining other than drilling to form the bore 14 and the end of the tube 10 has been given a slight chamfer, a simple operation.

Also as can be seen from FIG. 2 the join 22 can be severed by a drill inserted in the bore 14 and the tube then removed through the bore. After removing from the tube plate excess material of the join 22, a new tube 10 can be welded to the plate in the way described above. This feature is, of course, particularly important in connection with heat exchangers where a tube may fail during use and cannot be replaced in any simple way other than removal through the bore 14 in the tube plate. The insert 16 can, if required, be inserted through the bore 14 as a number of annular segments which are then assembled in situ to complete the insert. Any gaps between assembled segments must not be more than three thirty-seconds inch. In such a case a very considerable excess of weld metal can be provided and in certain circumstances this may be desired. However, this excess of weld metal is provided at the expense of simplicity of assembly.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

We claim:

1. A method of making a welded joint between a cylindrical tube having a frusto conical outer surface at one end and a tube sheet or header comprising the steps of:
   a. providing a tube sheet with a bore having a diameter slightly larger than the outside of said tube,
   b. positioning an annular filler insert having a frusto conical inner surface adjacent one end of said bore, and placing said one end of said tube to be joined to said sheet in engagement with said filler insert, said insert having a cross-section such that it will fuse during the making of a weld and will become united with said end of said tube and with said tube sheet to give a smooth crevice-free weld contour between said tube and said tube sheet, and
   c. making a circumferential weld from within said bore with an inert gas shielded non-consumable electrode electric arc welder which fuses said insert and unites it with said end of said tube and with said tube sheet giving a smooth crevice free weld contour between said tube and said tube sheet.

2. A method according to claim 1 in which the composition of the filler insert is chosen so to avoid hot cracking of said join during welding and embrittlement of said join.

3. A method according to claim 1 further comprising the step of providing a controlled atmosphere around the outside of said filler insert and said end of said tube during welding.

* * * * *